United States Patent [19]

Yuasa

[11] Patent Number: 4,767,923
[45] Date of Patent: Aug. 30, 1988

[54] HAND-HELD IMAGE READING APPARATUS WITH POSITION TRACKER

[75] Inventor: Toshiaki Yuasa, Yokohama, Japan

[73] Assignee: Canon Kabushiki Kaisha, Tokyo, Japan

[21] Appl. No.: 897,427

[22] Filed: Aug. 18, 1986

[30] Foreign Application Priority Data

Aug. 21, 1985 [JP] Japan .................................. 60-181827

[51] Int. Cl.$^4$ .............................................. G01V 9/04
[52] U.S. Cl. ............................. 250/221; 250/231 SE; 340/710; 382/59
[58] Field of Search ................ 358/294, 293; 340/710; 33/1 M; 382/59, 67; 74/471 XY, 471 R; 250/202, 221, 231 SE; 235/472

[56] References Cited

U.S. PATENT DOCUMENTS

| | | | |
|---|---|---|---|
| 3,473,157 | 10/1969 | Little et al. | 250/202 |
| 3,502,882 | 3/1970 | Von Voros | 250/202 |
| 3,602,638 | 8/1971 | Pascoe et al. | 250/202 |
| 3,624,283 | 11/1971 | Logan | 250/202 |
| 4,464,652 | 8/1984 | Lapson et al. | 340/710 |
| 4,562,347 | 12/1985 | Hovey et al. | 250/221 |
| 4,639,790 | 1/1987 | Kusaka | 358/294 |

*Primary Examiner*—Edward P. Westin
*Assistant Examiner*—Khaled Shami
*Attorney, Agent, or Firm*—Fitzpatrick, Cella, Harper & Scinto

[57] ABSTRACT

An image reading apparatus includes three two-dimensional position detection mechanisms and an image reading mechanism including a line sensor array. Each two-dimensional position detecting mechanism includes a pair of ball rotation detecting mechanisms perpendicular to each other. The ball rotation detecting mechanisms are arranged that optical detection elements are arranged near discs with slits assembled integrally with rollers in rolling contact with a ball exposed below a lower surface of a bottom surface of a housing. The detection elements detect detecting positions, rotational angle and rotational direction of the balls.

11 Claims, 1 Drawing Sheet

HAND-HELD IMAGE READING APPARATUS WITH POSITION TRACKER

BACKGROUND OF THE INVENTION

1. Field of the Invention

The present invention relates to a compact image reading apparatus and, more particularly, to a hand-held image reading apparatus.

2. Related Background Art

Conventional image reading apparatuses (to be referred to as image scanners hereinafter) are classified into sheet image scanners, for inserting a sheet and reading image data therefrom, and book image scanners, for reading image data from a sheet or a book placed on an original table by mechanically scanning a sensor.

It is, however, impossible to read image data from a very large sheet in the conventional image scanners. If an image scanner for reading a very large sheet is to be prepared, a very large sheet drive carrier or original table is required and a large number of sensors must be arranged, resulting in an expensive image scanner.

In order to solve this problem, a hand-held image scanner (i.e., a one-dimensional reader) has been used. However, the hand-held scanner must be moved accurately along a predetermined line, resulting in poor operability.

Another conventional image scanner is an X-Y image scanner which is moved in the X-Y plane to read two-dimensional image data. However, in this case, a matrix-line X-Y coordinate image must be prepared. The image scanner must read image data while detecting the matrix, thus also resulting in poor operability.

SUMMARY OF THE INVENTION

It is an object of the present invention to provide an image reading apparatus which eliminates the conventional drawbacks.

It is another object of the present invention to provide an image reading apparatus with good operability.

It is still another object of the present invention to provide an improved two-dimensional image reading apparatus.

It is still another object of the present invention to provide a hand-held image reading apparatus using a line image sensor.

It is still another object of the present invention to provide an image reading apparatus capable of accurately reading image data even if a moving speed varies.

According to the present invention, the foregoing objects are achieved by providing an image reading apparatus having a plurality of two-dimensional position detection means, and an image reading means, in a housing. Each of the position detection means includes means for enabling the housing to move freely on a plane, and generates a signal in response to such movement. The image reading means generates an image signal corresponding to the signal from the position detection means. Means may also be provided for detecting skew of the image reading means, and/or means for detecting slippage between the housing and an original to be read.

The above and other objects, features and advantages of the present invention will be apparent from a consideration of the following detailed description in conjunction with the accompanying drawings.

DETAILED DESCRIPTION OF THE PREFERRED EMBODIMENT

The preferred embodiment of the present invention will be described with reference to the accompanying drawings.

Figure 1:
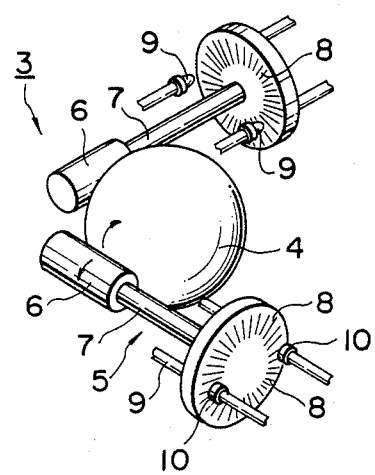
FIG. 1 is a perspective view showing a two-dimensional position detection mechanism in an image reading apparatus according to the preferred embodiment of the present invention.
Figure 2:
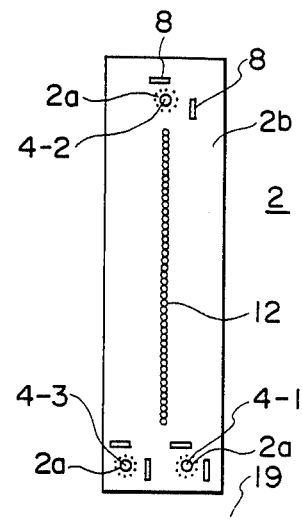
FIG. 2 is a bottom view of a bottom plate of a housing of the mechanism in FIG. 1.
Figure 3:
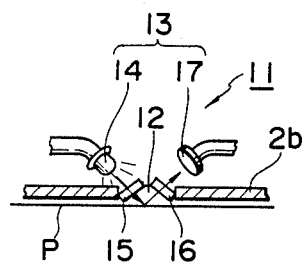
FIG. 3 is a front view showing an image sensor of the mechanism in FIG. 1.

The arrangement of the preferred embodiment will first be described. A hand-held image scanner 1 (FIG. 4) mainly includes a two-dimensional position detection mechanism 3 (FIG. 1) arranged inside a substantially parallel-epipedal housing 2 (FIG. 2) and an image reading mechanism 11 (FIG. 3).

The two-dimensional position detection mechanism 3 comprises a ball 4 and a pair of ball rotation detecting means 5. In each rotation detecting means 5, the ball 4 is rotatably held in a ball hole 2a formed in a predetermined position of a bottom plate 2b of the housing 2, as shown in FIG. 2. A pair of rollers 6 are perpendicular to each other and are brought into rolling contact with the surface of the ball 4 in a plane which passes through the center of the ball 4 and which is parallel to the bottom plate 2b. One end of each of several rotating shafts 7 is connected to a corresponding roller 6, and the other end thereof is connected to the center of a corresponding one of several discs 8 with slits. Two pairs of light-emitting diodes (LEDs) 9 and phototransistors 10 are arranged such that each pair sandwiches the disc 8 therebetween.

The rotating shafts 7 are rotatably supported by the bottom plate 2b. A predetermined number of radial slits 8s are formed in the peripheral portion of each disc 8 at equal angular intervals. The combinations of the diodes 9 and the transistors 10 are arranged at predetermined locations facing the slits 8s.

The image reading mechanism 11 comprises an image sensor array of image sensors 13 facing a predetermined number of apertures aligned along the longitudinal direction of the bottom plate 2b in FIG. 2. Each image sensor 13 is arranged as shown in FIG. 3. Light from the light-emitting diode 14 is focused by a focusing lens 15 to form a beam spot on a sheet P. Light reflected by the surface of the sheet P is focused by a focusing lens 16 on a phototransistor 17, thereby reading an image from the sheet P.

Figure 4:
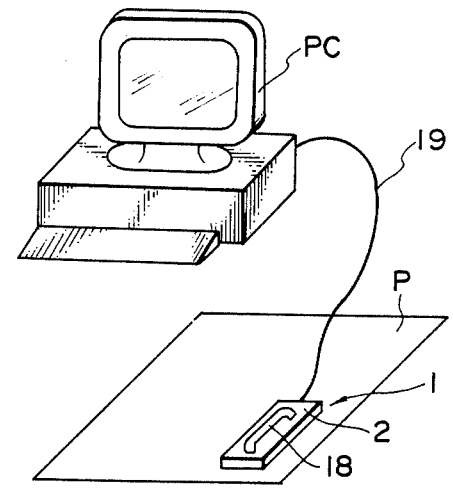
FIG. 4 is a perspective view showing a system including the mechanism in FIG. 1.

FIG. 4 is a schematic perspective view of a system according to this embodiment. A handle 18 is attached to the upper surface of the housing 2 of the hand-held image scanner 1 to allow an operator to scan an image. An interface cable 19 is connected to the image scanner 1 to send a read position or an image signal to a data processor (e.g., a personal computer) PC which serves as a data processing apparatus.

As best shown in FIG. 2, three two-dimensional position detecting mechanisms 3 are arranged such that parts of the corresponding balls 4-1, 4-2, and 4-3 are exposed beneath the lower surfaces of the bottom plate 2b. If only a rotational angle is to be read, only two position detection mechanisms 3 are required. However, since three position detection mechanisms 3 are provided, a reading error caused by slippage of the corresponding ball 4-1, 4-2, and 4-3 can be eliminated. In addition, the housing 2 can be stably moved along the sheet P to accurately read the image.

The operation of the image scanner in FIG. 4 will now be described.

The operator holds the handle 18 to move the image scanner 1 on the sheet P having a large image of A1 or A2 size along an arbitrary direction. The balls 4-1, 4-2, and 4-3 are rotated, and the discs 8 with slits 8s are rotated by the rollers 6 since the rollers 6 are in rolling contact with the corresponding balls 4-1, 4-2, and 4-3. The rotational speed is detected according to the number of slits passing between the corresponding combination of the light-emitting diode 9 and the phototransistor 10. The rotational direction is detected by the ON timings of the two phototransistors 10. The rotational speed and direction signals are sent to the data processor PC. The ball rotation detecting means 5, i.e., the combinations of the two-dimensional detection mechanisms 3, read the position of the image scanner 1. At the same time, image pattern information obtained by the position of the image scanner 1 is transferred to the data processor PC through the interface cable 19.

By manually scanning the image of a large sheet placed on a large flat table, the image can be read. At the same time, the read position can be detected without using a separate X-Y matrix pattern. The image and position data is transferred to a data processing apparatus, thus processing the image. The pair of phototransistors 10 are arranged in each x- and y-axis slit detecting means for the following reason. The x- and y-axis scanner displacements can be measured by counting pulses of the pulse strings from the phototransistors. The direction of the scanner moved along the x or y direction can be detected by forward or reverse rotation of the ball 4. In order to detect the forward or reverse rotation of the ball 4, the signals from the pair of transistors 10 are utilized. More specifically, the forward or reverse rotation along the x or y direction is detected according to a phase difference between the pulses from the first and second phototransistors constituting the transistor pair.

If, for example, the scanner 1 is moved from the reference position along the x direction and the position detecting means 3 for the ball 4-1 located at one end of the sensor 13 counts n slits along the x direction, the following occurs. First, the read data from the line sensor 13 is sent to the data processor PC. The display data is stored in a bit map memory. The data is read out from the bit map memory and displayed. The storage position in the memory is a memory area corresponding to point (x1, y1) detected by the ball 4-1 and point (x2, y2) detected by the ball 4-2. The position detecting means 3 count n slits each to store the line data from the sensor 13 in the memory area corresponding to the detected coordinate data detected by the corresponding balls. The data is then read out from the memory and displayed. In this manner, the scanner 1 is moved such that the balls 4-1 and 4-2 are always in rolling contact with the sheet. The n-slit outputs from the line sensor are sequentially displayed according to the coordinate data detected by the balls 4-1 and 4-2. The detected point (x, y) is determined by the number of slits with respect to the sheet end as the reference position (which thus is the scanning start position of the scanner 1). After finishing moving the scanner 1 to the end of a one-line width, the operator shifts the scanner 1 in the y direction to change the y-coordinates of the balls 4-1 and 4-2. The scanner 1 is moved in the reverse x-direction to scan another area in the reverse direction. Similarly, the read data corresponding to the detected coordinate data is stored in the memory and is displayed. The above operation is repeated to read one-page data from the sheet.

A displacement represented by the slit count by the ball 4-3 is compared with that by the ball 4-2 upon movement of the scanner 1. If a noncoincidence occurs between these displacements, slippage of the balls has occurred. The data processor PC generates an alarm to signal to the operator that a read error has occurred.

What is claimed is:

1. An image reading apparatus comprising:
   a housing;
   a plurality of two-dimensional position detection means contained in said housing, each of said position detection means having means for enabling said housing to move freely on a plane and each of said position detection means generating a signal in response to movement of said housing; and
   image reading means contained in said housing for generating an image signal corresponding to the signals from said position detection means,
   said plurality of two-dimensional position detection means being so arranged as to cooperate with each other in such a manner that the signals from said plurality of position detection means provide more information regarding the position and/or orientation of said image reading means than is provided by one of said position detection means alone.

2. An apparatus according to claim 1, wherein each of said two-dimensional position detecting means includes detection elements for detecting a rotary body and for detecting a rotational amount and a direction of rotation of the rotary body.

3. An apparatus according to claim 1, wherein said two-dimensional position detecting means each comprise a pair of ball rotation detecting means perpendicular to each other, each of said ball rotation detecting means being structured and arranged such that optical detection elements are arranged near discs with slits assembled integrally with rotary members in rolling contact with a ball exposed below a lower surface of a bottom surface of a housing.

4. An image reading apparatus according to claim 1, further comprising means for detecting a skew of said image reading means in accordance with the signals from said plurality of position detection means.

5. An image reading apparatus according to claim 4, wherein said position detection means are located in both ends of said image reading means.

6. An image reading apparatus according to claim 4, wherein said image reading means includes an array of photo-sensors.

7. An image reading apparatus according to claim 1, further comprising means for detecting a slippage between said housing and an image to be read by said image reading means in response to the signals from said plurality of position detection means.

8. An image reading apparatus according to claim 7, wherein said slippage detection means detects the slippage by comparing an amount of movement of said housing detected by one of said plurality of position detection means with that detected by another one of said position detection means.

9. An image reading apparatus according to claim 7, further comprising means for generating an alarm indicating a reading error when the slippage is detected by said slippage detection means.

10. An image reading apparatus according to claim 1, further comprising memory means for storing the image read by said image reading means.

11. An image reading apparatus according to claim 10, wherein said memory means stores the image read by said image reading means at an address based on the signal from the plurality of position detection means.

* * * * *